United States Patent [19]
Dabich

[11] Patent Number: 4,600,114
[45] Date of Patent: Jul. 15, 1986

[54] THERMO EXPANSION COMPENSATOR

[76] Inventor: Robert M. Dabich, 7212 Patterson Dr., Garden Grove, Calif. 92641-1490

[21] Appl. No.: 538,188

[22] Filed: Oct. 3, 1983

[51] Int. Cl.$^4$ ............... B65D 90/22; B65D 90/28; B65B 3/00; A16L 55/04
[52] U.S. Cl. ............................. 220/85 B; 138/30
[58] Field of Search ............... 220/85 B; 138/26, 28, 138/30

[56]  References Cited
U.S. PATENT DOCUMENTS

| | | | |
|---|---|---|---|
| 2,001,873 | 5/1935 | Hansson | 220/85 B |
| 2,283,439 | 5/1942 | Herman | 138/30 |
| 2,337,771 | 12/1943 | Roberts | 138/30 |
| 2,877,799 | 3/1959 | Hildenbrandt | 138/26 |
| 2,904,077 | 9/1959 | Trumper | 220/85 B |
| 3,003,659 | 10/1961 | Miller | 220/85 B |

Primary Examiner—William T. Dixson, Jr.
Attorney, Agent, or Firm—Charles H. Thomas

[57] ABSTRACT

An explosion proof vault for housing electrical equipment is isolated from ambient air by the provision of an auxiliary expansion chamber. The auxiliary expansion chamber is coupled to the explosion proof casing and an inelastic bladder is located in the auxiliary expansion chamber in fluid communication with the explosion proof casing. An airtight seal around the mouth of the bladder prevents the passage of air between the explosion proof casing and the auxiliary expansion chamber except within the bladder.

7 Claims, 2 Drawing Figures

THERMO EXPANSION COMPENSATOR

BACKGROUND OF THE INVENTION

1. Field of the Invention

The present invention relates to explosion proof vaults which are typically employed to house electrical equipment in areas which may be exposed to explosive fumes.

2. Description of the Prior Art

In commercial and military aviation ground support facilities aircraft are serviced on the ground at aircraft terminals, remote parking locations, or at maintenance bases. The ground support functions which must be performed at such locations include refueling, the provision of electrical power to the aircraft while it is on the ground, the provision of cooling air to enhance cabin comfort, and the provision of pressurized air to start the aircraft engines. Such ground support servicing functions are performed at modern air terminals using umbilical cords, lines and conduits which are housed within prefabricated pits when aircarft are not present on the ground in the vicinity. Such prefabricated pits are installed at aircraft fueling and loading areas. The pits are enclosures which are installed below the surface of loading and refueling aprons, at aircraft terminals, remote parking locations, and maintenance bases.

The prefabricated pits house valves, junction boxes, cooling air terminations and other terminal equipment used to service aircraft that have been docked. Umbilical pipes and lines, otherwise housed within the pits, are withdrawn from the pits through hatches and are coupled to the docked aircraft to supply it with fuel, air and electrical power. The use of such subsurface pits eliminates the need for mobile trucks, carts and other vehicles which are otherwise present in the loading area and which interfere with the arrival and departure of aircraft at a loading gate.

As a safety precaution all ground support equipment items in such prefabricated pits which employ electrical contacts must be housed within explosion proof enclosures due to the presence of vaporized fuel in the vicinity. The presence of vaporized fuel in air can lead to explosive gaseous mixtures. Such mixtures could be ignited by arcing electrical contacts unless such contacts are housed in an explosion proof vault.

In an explosion proof enclosure, the casing forming the enclosure is not completely airtight. If it were, an arcing electrical contact in an explosive atmosphere would ignite the explosive vapors and cause the casing to shatter. In an explosion proof enclosure the interface between the strong, heavy casing sections is sufficiently long, and sometimes tortuous, so that any gaseous mixture ignited within the casing will travel a sufficient distance across the interface and will cool before escaping the enclosure. The path of escape of the expanding gas at the interface is long enough so that the ignited gas cools sufficiently to extinguish any flame. Thus, despite ignition and explosion within the enclosure, no flame will escape the enclosure. As a result, no gas outside of the enclosure will be ignited as a result of an explosion within the enclosure.

One problem which exists within conventional explosion proof casings is that the enclosure "breathes" with changing ambient temperature. The enclosure is cool in the early morning hours, perhaps 60° F. With increasing heat of the day the temperature rises. In some locations the interior of the enclosure reaches a temperature of as much as 160° F. The air in the enclosure expands by a volume of about 17% for such a temperature change. The expanding air escapes through the casing interface.

As the enclosure cools in the late afternoon and evening, air containing moisture is drawn into the enclosure through the casing interface. The moisture in the air condenses in the enclosure. With the passage of time, the moisture builds up in the enclosure because the ambient air drawn in is usually warmer than the air inside of the enclosure. That is, air laden with water vapor is drawn into the enclosure, while relatively dry air is expelled therefrom. The moisture remaining in the enclosure attacks the control mechanisms housed therewithin and corrodes relay and terminal contacts and otherwise disrupts the operation of the encased equipment.

SUMMARY OF THE INVENTION

The present invention involves the provision of a bladder internal to the explosion proof vault housing electrical or other sensitive equipment. In explosion proof enclosures of the type described, the bladder is also housed within the confines of an explosion proof enclosure. Preferably, however, the enclosure is formed of a main casing housing the electrical equipment to be protected and an auxiliary expansion chamber which is itself constructed as an explosion proof structure. The main casing and the auxiliary expansion chamber are preferably connected by a pipe extending therebetween.

The bladder is housed within the auxiliary expansion chamber, though it is pneumatically isolated therefrom. The mouth of the bladder is preferably sealed to an end of the pipe interconnecting the main equipment casing and the expansion chamber. There is thus a free passage of air between the main casing and the interior of the bladder. The bladder will expand and contract within the expansion chamber, but no air passes between the interior of the bladder and the surrounding volume of the expansion chamber.

With changes in ambient temperature the air in the equipment enclosure will follow the path of least resistance and "breath" into and out of the bladder rather than "breath" through the casing interface between the main casing sections. Since the same air passes back and forth between the interior of the bladder and the cavity of the main casing, no change in moisture level of the enclosure will occur. As a result, the equipment within the casing is isolated from the ambient atmosphere despite the absence of a seal at the casing section interface.

The bladder is an inelastic structure. Any elasticity in the bladder structure, within the range of normal expansion and contraction thereof, would create a back pressure which would defeat the purpose of the bladder. That is, if any back pressure were to exist, air would tend to be forced back from the bladder into the main casing and the casing would thereupon "breath" through the casing section interface.

The auxiliary expansion chamber is also an explosion proof structure comprised of auxiliary casing sections which meet in an interface. The auxiliary expansion chamber will "breath" into and out of the surrounding, ambient atmosphere. Naturally moisture will collect in the expansion chamber for the reasons hereinbefore described. However, since there is no equipment in the expansion chamber, the collection of moisture therein does not entail any harmful result.

The same principal of the invention can be applied to different types of explosion proof containers other than those used in prefabricated pits for ground service of aircraft. For example, a "non-breathing" bladder and expansion chamber can be employed in gasoline storage containers, oil refinery control panels, tank trucks and fuel storage tanks. Moreover, the invention can be applied to non-explosion proof sealed systems such as computer housings and the like.

One distinct feature of the present invention is that there is no exchange of air between the explosion proof enclosure and the ambient air surrounding the enclosure. The same mass of air moves cyclically back and forth between the casing housing the equipment and the bladder in the auxiliary expansion chamber. Since no new air flows into the equipment casing, there is no change in moisture level therein. Thus collection of moisture is thereby avoided.

The invention may be described with greater clarity and particularity by reference to the accompanying drawings.

DESCRIPTION OF THE EMBODIMENT

Figure 1:
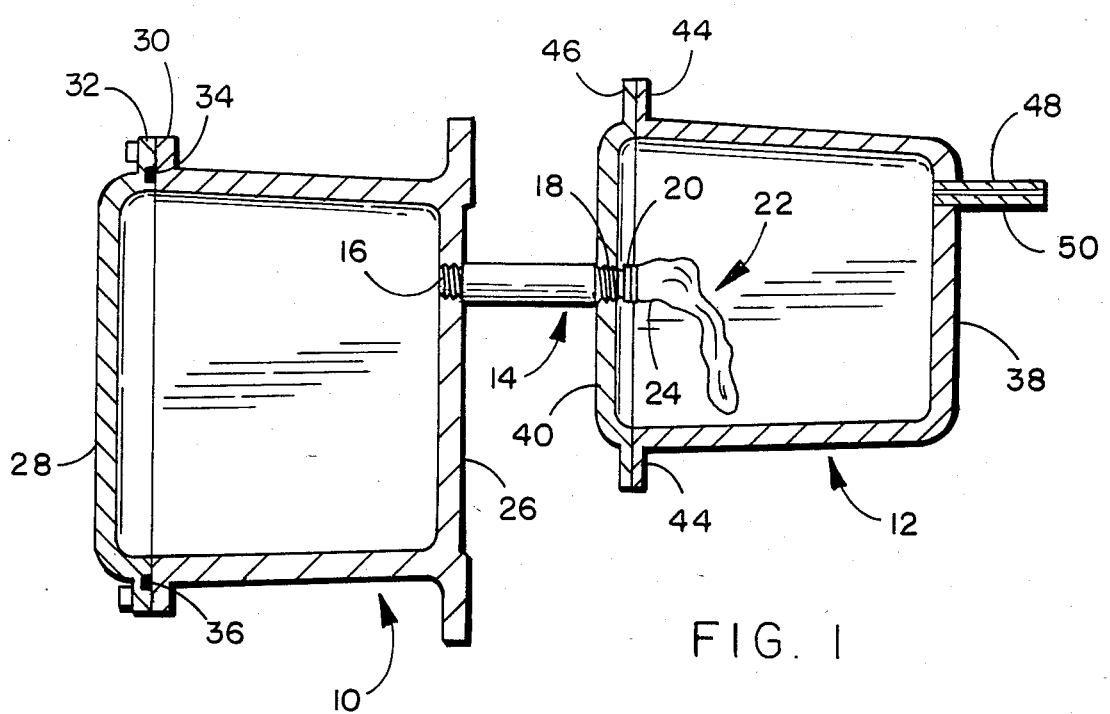
FIG. 1 illustrates an explosion proof vault according to the invention surrounded by relatively cool ambient air.

FIG. 1 illustrates an equipment vault system including an explosion proof casing 10 for housing electrical equipment that includes components with contacts subject to arcing, such as relays. An auxiliary expansion chamber 12 is provided and is coupled to the equipment casing 10 by means of an annular, cylindrical pipe 14, threaded at either end as indicated at 16 and 18, and including a nipple 20. An inelastic bladder 22 is disposed in the expansion chamber 12. The mouth 24 of the bladder 22 is secured on the nipple 20 with an airtight seal. A conventional compression band may be employed for this purpose.

The main equipment casing 10 is formed of a generally drum shaped, steel shell 26 to which a steel lid 28 is secured. The shell 26 and the lid 28 meet in corresponding, mating flanges 30 and 32 which define an interface 34 extending about the entire perimeter of the casing 10. The flanges 30 and 32 extend outwardly from the cavity defined within the casing 10 a sufficient distance so that any gas ignited within the cavity of the casing 10 will cool sufficiently before leaving the casing 10 through the interface 34 so that no flame emanates from the casing 10. The interface 34 may include a gasket, such as that depicted at 36, to prevent moisture from seeping into the casing 10.

The expansion chamber 12 is also formed of a shell 38 and a lid 40. The shell 38 and lid 40 are joined at an interface 42 between their respective flanges 44 and 46. The auxiliary expansion chamber 12 is thereby also formed as an explosion proof structure.

To prevent any back pressure from building up in the expansion chamber 12, a strong annular cylindrical steel vent tube 48 is welded into an aperture in the shell 38. The diameter of the bore 50 in the vent tube 48 is sufficiently small, and the vent tube 48 is sufficiently long so that any ignited gas escaping from the auxiliary expansion chamber 12 through the vent tube 48 will cool sufficiently, before escaping the auxiliary expansion chamber 12. Thus no flame will emanate from the vent 48.

Since the mouth 24 of the bladder 22 is sealed to the nipple 20 of the pipe 14, the auxiliary expansion chamber 12 is coupled to the equipment case 10 in pneumatic isolation therefrom. The bladder 12 may be constructed of any flexible inelastic, water impermeable material, such as nylon or plastic.

The equipment vault system of the invention is depicted in FIG. 1 as it appears when surrounded by relatively cool ambient air. Since the casing 10 is relatively cool, the air within the cavity defined therewithin is also relatively cool. At a constant pressure, any mass of gas will occupy less volume when it is cool than when it has been heated. Accordingly, when the casing 10 and the air therewithin are cool, the gas will contract. When the gas within the casing 10 cools and contracts, additional gas is not drawn in through the interface 34 between the shell 26 and the lid 28. Rather, gas is drawn into the casing 10 from the bladder 22, thereby collapsing the bladder 22 within the auxiliary expansion chamber 12, as illustrated in FIG. 1. A negative pressure is avoided in the auxiliary expansion chamber 12 since ambient air is drawn into the expansion chamber 12 through the bore 50 in the vent 48. The pressure in the expansion chamber 12 within the bladder 22 and within the surrounding expansion chamber cavity is thereby equalized. This allows air to flow freely from the bladder 22 into the casing 10.

If the equipment vault system depicted is located within a prefabricated pit below the surface of an aircraft terminal or parking or service area, the temperature of the vault system will vary considerably throughout the day. Cyclical temperature variations of as much as 100° F. are not uncommon in some locations. With such temperature variations, the mass of gas within the cavity within the casing 10 will expand considerably when the temperature of the ambient air around the vault system rises.

Figure 2:
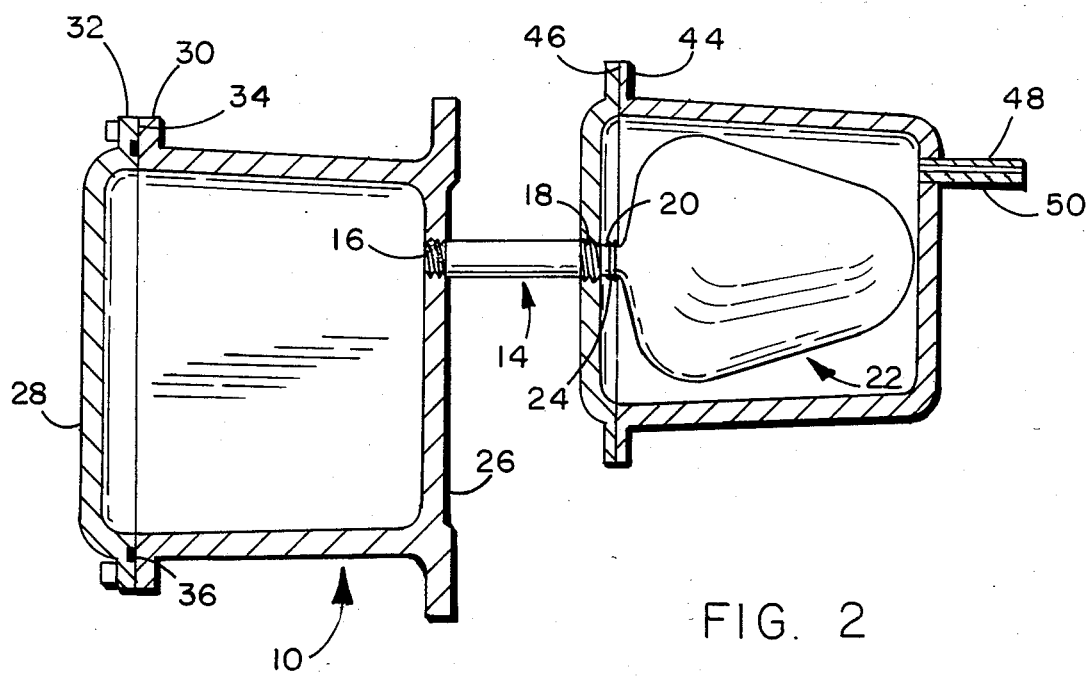
FIG. 2 illustrates an explosion proof vault of FIG. 1 surrounded by relatively warm ambient air.

FIG. 2 illustrates the condition of the vault system according to the invention when the temperature surrounding it has risen considerably above. Under such circumstances the mass of air within the cavity of the casing 10 will expand. According to the invention, the additional volume of expansion is provided within the bladder 22. According to Charles' Law, the volume occupied by the mass of gas within the casing 10 and the bladder 22 is directly proportional to temperature measured from absolute zero in the Rankine convention.

Since the volume of the bladder 22 expands considerably with rising temperature in the vault system, the surrounding air within the cavity in the expansion chamber 12 must be vented in order to avoid a back pressure on the bladder 22. Venting occurs through the vent 48, which may also serve as a drain.

It should be noted that the same gas resides within the casing 10 and portions of this must pass back and forth into and out of the bladder 22. There is no exchange of air with either air outside of the casing 10, or air within the surrounding cavity of the expansion chamber 12. Accordingly, there is no change in the moisture level within the casing 10 despite repeated and prolonged cycles of gas expansion and contraction.

In contrast, it should be noted that there is an exchange of air in the surrounding cavity in the expansion chamber 12. The air that is drawn in through the vent 48 is not the same air that is expelled therefrom. Because the air drawn in will typically be more ladened with moisture than the air expelled through the vent 48, moisture will collect within the expansion chamber 12. However, because the expansion chamber 12 is pneumatically isolated from the equipment casing 10, the collection of moisture in the expansion chamber 12 does not adversely affect the equipment in the casing 10.

The same principal of providing an expansion chamber and a bladder in fluid communication with a main casing can be applied to numerous forms of hermetically isolated containers. For example, gasoline cans, tank trucks, fuel storage tanks, refinery control panels, computer housings and other hermetically isolated enclosures can be constructed in accordance with the invention.

Undoubtedly, numerous other variations and modifications of the invention will become readily apparent to those familiar with hermetically sealed enclosures. Accordingly, the scope of the invention should not be construed as limited to the specific embodiment illustrated, but rather is defined in claims appended hereto.

I claim:

1. An explosion proof equipment vault comprising a totally enclosed, self-contained, rigid walled casing defining a cavity of fixed volume insensitive to changes in thermal conditions and occupied by a gas and defining a path of escape of expanding gas, a rigid walled auxiliary expansion chamber likewise defining a cavity of fixed volume pneumatically isolated from said explosing proof casing and in clear communication with ambient air, and an inelastic bladder disposed in said expansion chamber and in pneumatic communication with said explosion proof casing and in pneumatic isolation from ambient air, whereby said cavity of said auxiliary expansion chamber is totally occupied by said bladder and by a gas.

2. An equipment vault according to claim 1 further characterized in that said auxiliary expansion chamber is also an explosion proof structure, and further comprising a pipe coupling said casing and said expansion chamber together, and said bladder is mounted on an end of said pipe in said expansion chamber and is inflated and deflated through said pipe.

3. A method of providing isolation from external moisture to equipment in rigid walled, totally enclosed, self-contained, explosion proof casing which defines a cavity of fixed pneumatic volume insensitive to changes in temperature and which is occupied by a gas and which defines a path of escape of expanding gas, comprising providing said explosion proof casing with a rigid walled auxiliary expansion chamber, disposing an inelastic bladder in said expansion chamber to expand and contract therein in response to changes in temperature, providing pneumatic communication between said bladder and said explosion proof casing, providing clear communication between said auxiliary expansion chamber and ambient air and establishing an airtight seal between said bladder and said expansion chamber.

4. A method according to claim 3 further comprising establishing said airtight seal within said expansion chamber.

5. An explosion proof container comprising a totally enclosed, self-contained, rigid walled case isolated from external moisture and defining a cavity occupied by a gas and defining a path of escape of expanding gas and having a fixed volume that is insensitive to thermal changes, an auxiliary rigid walled expansion chamber in clear communication with ambient air likewise having a fixed volume and coupled to said case in pneumatic isolation therefrom, and an inelastic bladder disposed in said auxiliary expansion chamber and in pneumatic communication with said case and in pneumatic isolation from ambient air.

6. A hermetically isolated container according to claim 5 in which both said case and said expansion chamber are explosion proof structures.

7. A hermetically isolated container according to claim 6 further comprising a hollow pipe joining said case and said expansion chamber together and said bladder is mounted at an end of said pipe in said expansion chamber.

* * * * *